United States Patent [19]

Chan et al.

[11] Patent Number: 4,726,022
[45] Date of Patent: Feb. 16, 1988

[54] METHOD AND APPARATUS FOR STRESSING THE DATA WINDOW IN MAGNETIC STORAGE DEVICES

[75] Inventors: Patrick M. Chan; Shin C. Chen, both of San Jose, Calif.

[73] Assignee: International Business Machines Corporation, Armonk, N.Y.

[21] Appl. No.: 857,897

[22] Filed: Apr. 30, 1986

[51] Int. Cl.⁴ .......................... G06F 11/00; G11B 5/09
[52] U.S. Cl. ............................................. 371/5; 371/62; 360/51; 360/53
[58] Field of Search ................. 371/5, 28, 62; 360/51, 360/53

[56] References Cited

U.S. PATENT DOCUMENTS 4,394,695  7/1983  Mahon ................................... 360/53
4,417,286  11/1983 Anderson ............................... 360/51
4,459,623  7/1984  Glenn .................................. 360/51 X
4,578,721  3/1986  Brannan ............................ 360/53 X

OTHER PUBLICATIONS

"Effect of Bitshift Distribution on Error Rate in Magnetic Recording" by Eric R. Katz et al, IEEE Transactions on Magnetics, vol. MAG-15, #3, May 1979.

Primary Examiner—Jerry Smith
Assistant Examiner—Robert W. Beausoliel, Jr.
Attorney, Agent, or Firm—F. David LaRiviere; Simon K. Lee

[57] ABSTRACT

A system for controllably varying the width of the data window in a magnetic storage device to perform comparative data detection error rate measurements thereon is provided. The system generates the programmably and continuously variable stressed data window symmetrically within, and in locked phase with, the full data window under the control of a single current DAC in the VCO of the device.

10 Claims, 9 Drawing Figures

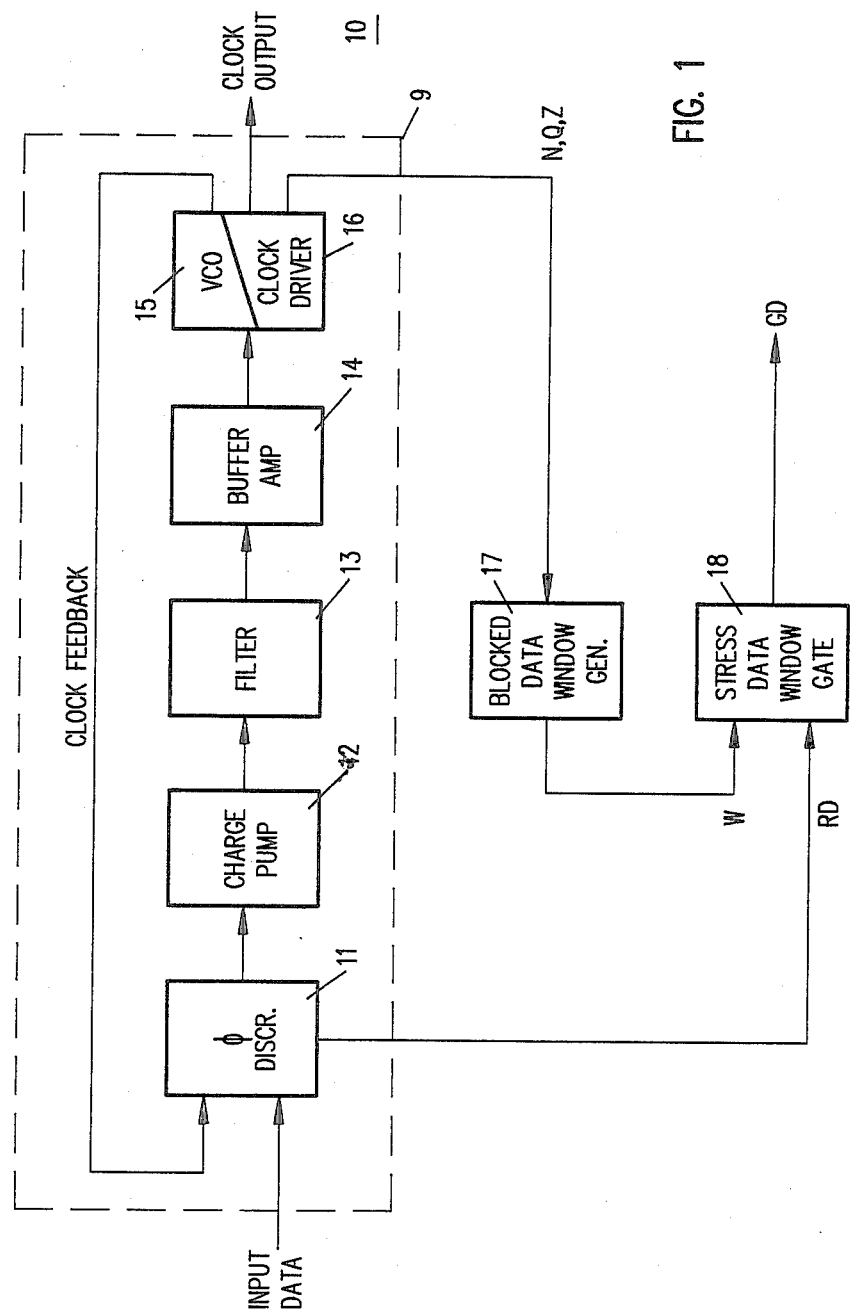

METHOD AND APPARATUS FOR STRESSING THE DATA WINDOW IN MAGNETIC STORAGE DEVICES

BACKGROUND OF THE INVENTION

The present invention relates generally to testing and evaluation of the data recovery processing system in magnetic data recording and storage systems. In particular, it relates to measuring the bit error rate arising during the readback process as a function of data window size.

In the data recovery process in the typical digital magnetic storage system, the interval during which a readback pulse representing a bit of data is detected is referred to as the "data window". In the ideal system, having a noiseless channel and no intersymbol interference, there is no "bitshift", i.e. all pulses occur in center of the data window. In real systems, however, particularly in high density storage devices, readback pulses representing data bits are shifted with respect to center of the data window as a result of density of recorded data and the code patterns of such data in the data signal. See, for example, an article entitled, "Effect of Bitshift Distribution on Error Rate in Magnetic Recording", IEEE TRANSACTIONS ON MAGNETICS, Vol. MAG-15, No. 3, May 1979 by Eric R. Katz and Thomas G. Campbell.

In addition to interaction-induced bitshift, readback pulses are also subject to additional noise-induced bitshift. If pulses are shifted enough to fall outside the data window, they are counted as errors. Such information may be used to predict the right error rate in lieu of a direct measure of such error rate which generally requires considerable time.

A recording system may be evaluated directly, however, by measuring the error rate as a function of data window size. Historically, such a measurement has been tedious, time-consuming and costly, and the accuracy is typically unsatisfactory. In one system, described in U.S. Pat. No. 4,394,695, two methods for deriving error rate are described. In one arrangement, raw data is applied to a window generator which generates a window of predetermined width at the data clocking rate. The raw data is also applied to delay element which delays the data predetermined amounts with respect to the front edge of the data window. By selectively delaying the data signal, the data window is effectively narrowed. The narrowed window causes some data bits to fall outside of the window and provide a measure of error rate. Alternatively, the patent describes a system for applying data directly to a plurality of window generators, each of which generates a window of different width, for making comparative measurements of error rate with respect to gradually decreasing window widths.

SUMMARY OF THE INVENTION

In accordance with the present invention, the width of a data window in a magnetic data recording system is reduced (i.e., stressed) within the full data window by controlling a single current. The stressed data window is generated symmetrically within, and in phase with, the full data window.

A stressed data window according to the present invention is phase locked to a voltage controlled oscillator (VCO) and symmetrically disposed in time within the VCO clock window. Since the stressed data window tracks the VCO clock, the error rate measurement is far more accurate than prior art systems provide. The stressed data window is used by the VFO to selectively accept data bits which fall inside the stressed data window and reject all other data bits.

The width of the stressed data window of the present invention can be linearly changed by a current driven digital-to-analog converter (DAC). In this manner, a correlation between data detection error rate and data window width, and a data bit distribution within the data window, can be obtained. Thus, the stressed data window of the present invention is useful for evaluation of such storage devices, manufacturing screen test of such magnetics and for field upgrade of such devices.

DESCRIPTION OF THE DRAWING

FIG. 1 is a block diagram of a system for generating a stressed data window in accordance with the principles of the present invention.

DESCRIPTION OF THE PREFERRED EMBODIMENT

Figure 2A:
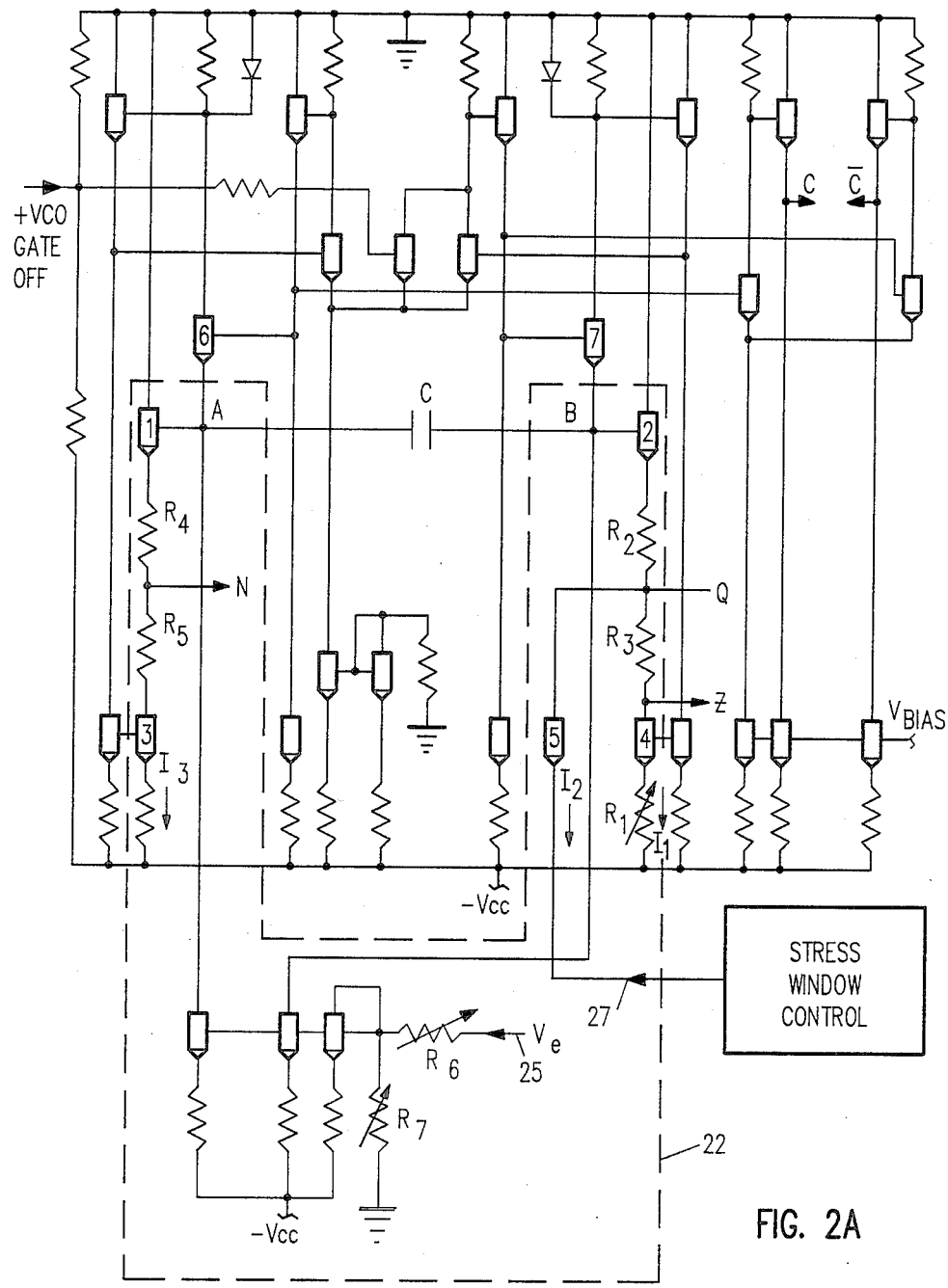
FIG. 2A is a schematic diagram of a VCO circuit modified for use in the system of FIG. 1.

Referring now to FIG. 1, the system for generating the stressed data window according to the present invention comprises phase-lock loop 9, blocked data window generator 17 and stress data window gate 18. Phase-lock loop 9 comprises phase discriminator 11, which provides phase difference between incoming data and the feedback clock produced by VCO and clock driver 16 and provides reshaped data pulses. Charge pump 12 charges or discharges filter 13 in response to signals from phase discriminator 11. Filter 13 provides required phase-lock loop stability. Buffer amplifier 14 provides low impedance driving capability for signals received from filter 13 to VCO and clock driver 16. Finally, VCO and clock driver 16 includes a voltage controlled oscillator (VCO) 15 and related driver circuits. In particular, phase-lock loop 9 is similar to such loops described in "Analog Integrated Circuit Design" by Alan B. Grebene, Van Nostand Reinhold Company, 1972, pp. 298–326.

Figure 2B:
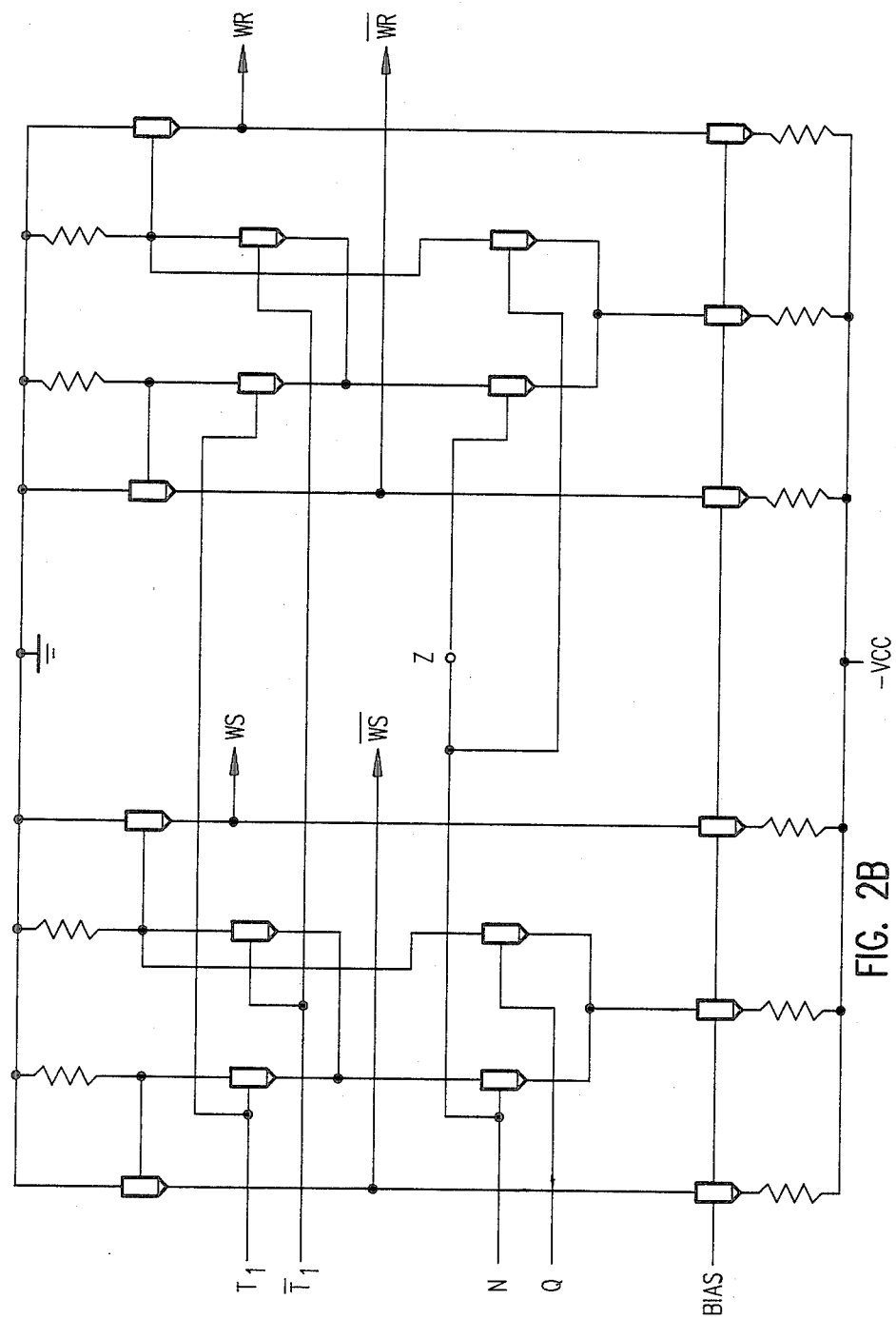
FIG. 2B is a schematic diagram of one part of the blocked data window generator circuit for use in the system of FIG. 1.
Figure 2C:
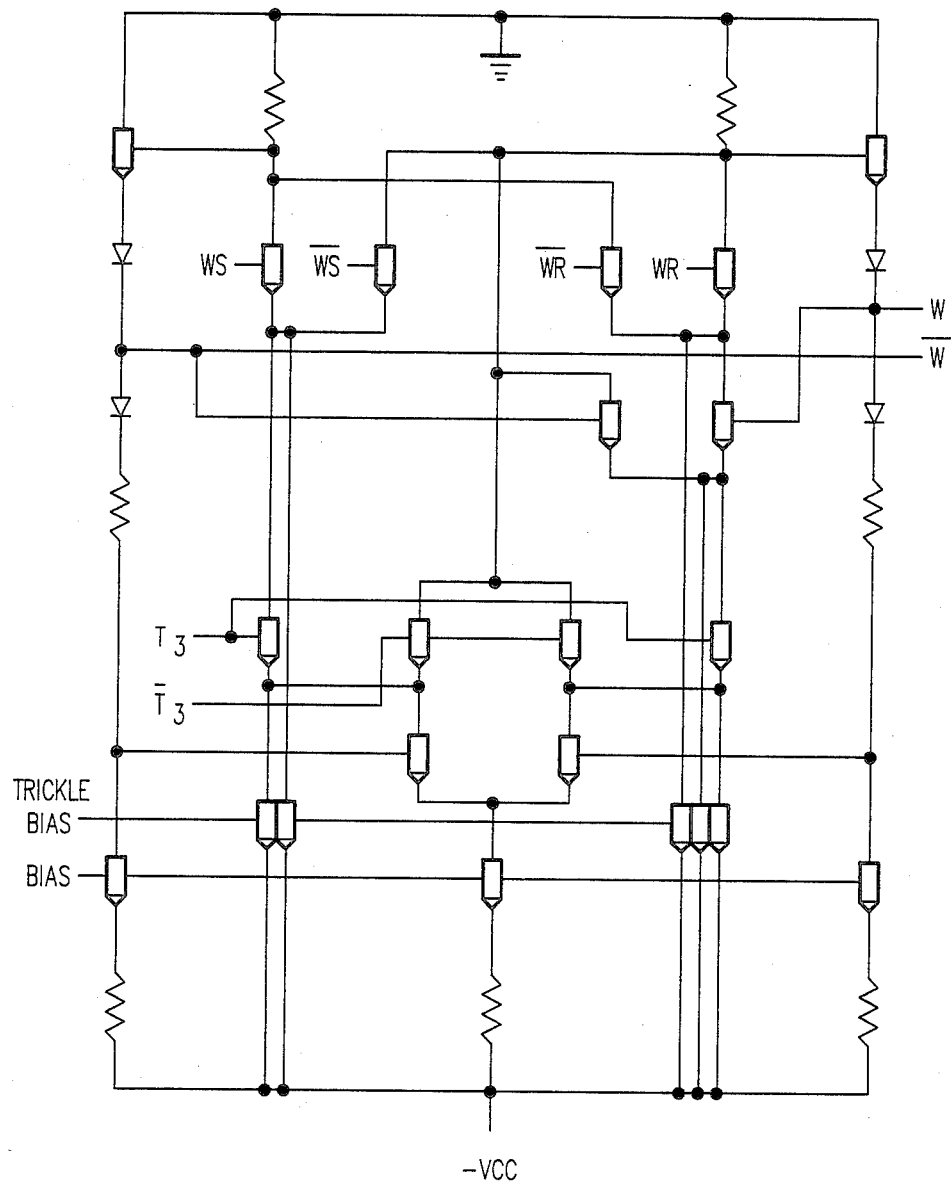
FIG. 2C is a schematic diagram of another part of the blocked data window generator circuit for use in the system of FIG. 1.

Blocked data window generator 17 includes circuitry shown in FIGS. 2B and 2C for generating the data blocking signals used to control stress data window gate 18 for deriving the stressed data window. The circuit for stress data window gate 18 shown in FIG. 2D produces logic control signals for generating data standardized to clock (DSTC) signals which is not part of the present invention.

Phase-lock loop (PLL) 9 receives input data bits to which it becomes locked. Signals produced by VCO and clock driver 15 are thus unambiguously defined by such bits for as long as data is received. Blocked data window generator 17 provides controlled signals when gated with the reshaped data signals from phase discriminator 11 to selectively accept data which falls within the stressed data window and reject all which do not. Thus, the smaller the stressed data window, the higher the data detection error rate and conversely. The reshaped data signals provided by phase discriminator 11 have constant pulse width and are derived as part of the phase discrimination process.

In accordance with the present invention, VCO 15 comprises a conventional VCO circuit modified by addition of data window stressing circuit 22 as shown in FIG. 2. The VCO 15 produces output signals conventionally in the same manner as such circuits described in "Analog Integrated Circuit Design" by Alan B. Grebene, Van Nostand Reinhold Company, 1972, pp. 313–315.

In the modified circuit, transistors T1 and T3 form an emitter follower stage to transistor T6 such that the voltage at node N follows the voltage at node A. Similarly, transistors T2 and T3 form a corresponding emitter follower stage to transistor T7 such that the voltages at nodes Q and Z follow the voltage at node B.

Resistor R1 is actively trimmed for symmetry of the stressed data window within the full data window which, in turn, is determined by the system clock frequency. Resistor R6 is passively trimmed to a nominal value. Thereafter R7 is actively trimmed for the desired VCO center frequency when terminal 25 is grounded. During normal operation, $V_e$, the feedback error voltage from buffer amplifier 14, is applied at terminal 25 to vary the VCO output signal frequency in accordance with the relation $$\Delta f \, \alpha \, V_e.$$

"Actively trimmed" refers to adjusting the value of the resistors while observing waveforms produced by an operating circuit. "Passively trimmed" resistors are adjusted to a fixed value while the circuit is inoperative.

Adjustment of the current at the emitter of transistor T5 controls the width of the stressed data window with respect to full data window width. After R1 is appropriately trimmed, the voltage difference between the voltage at node N and the voltage at node Q (or at node Z) can be linearly varied by selectively controlling the current flowing in the emitter of transistor T5.

Figure 3:
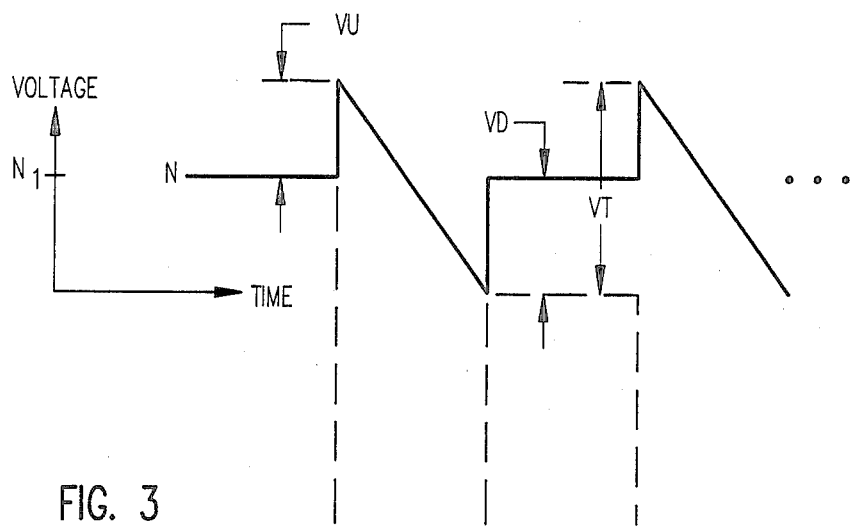
FIG. 3 is a timing diagram of the signal waveform produced at node N of the circuit of FIG. 2.

The waveform of the signal at node N is shown in FIG. 3. Peak-to-peak voltage VT is the sum of voltages VD and VU. VD represents the capacitive regeneration at node B required for conventional operation of VCO 15 which the voltage node A tries to follow. Voltage VU represents capacitive boost developed at node A. Voltage level $N_1$, which is offset from the voltage level at node A by an amount approximately equal to $V_{BE} - I_3 R_4$, is the DC voltage of waveform N when the charging current for capacitor C is from node A to node B.

VD is greater than VU owing to leakage through transistors 6 and 7, and $\Delta V$ is the difference between VD and VU, thus $$VD = VU + \Delta V, \text{ and}$$

$$VT = VD + VU.$$

Figure 4:
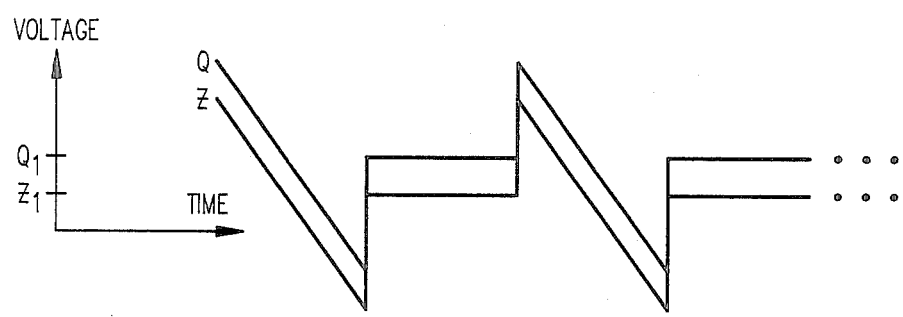
FIG. 4 is a timing diagram of the signal waveforms produced at nodes Q and Z of the circuit of FIG. 2.

In FIG. 4, waveforms Q and Z represent the voltage waveforms at nodes Q and Z, respectively. The voltage levels Q1 and Z1, which are offsets from the DC voltage level at node B by amounts equal to $-V_{BE} - (I_1 + I_2) R_2$ and $-V_{BE} - (I_1 + I_2) R_2 - I_1 R_3$, respectively, are the DC voltages of their respective waveforms when the charging current to capacitor C is from node B to node A.

Figure 5:
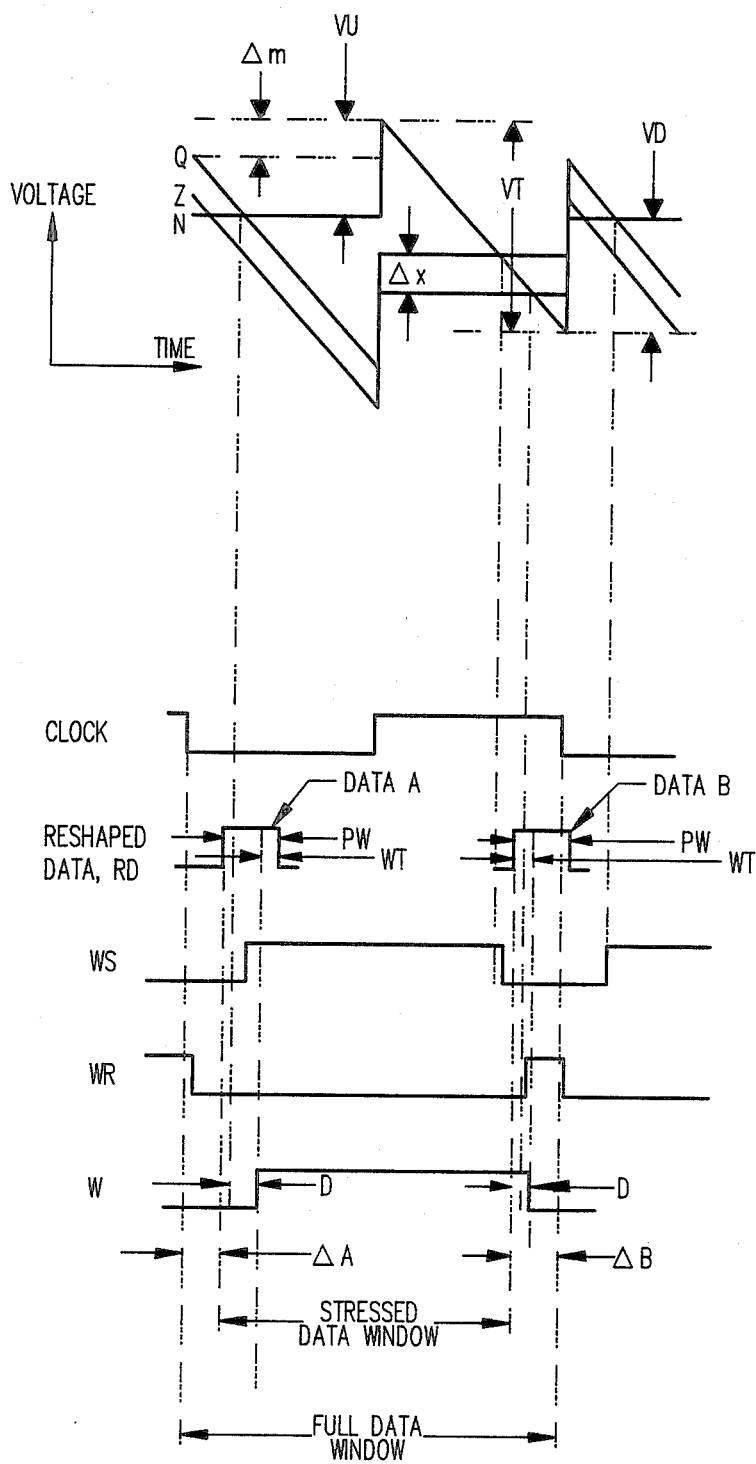
FIG. 5 is a timing diagram of the signal waveforms of FIGS. 3 and 4, together with signal waveforms produced by the circuits of FIGS. 2B and FIG. 2C.

FIG. 5 shows the timing relationship of the signals of FIGS. 3 and 4 during operation of the circuits of FIGS. 2A, 2B and 2C to produce the stressed data window of the present invention.

Waveforms WS and WR of FIG. 5 are produced by the circuit of FIG. 2B in response to waveforms N, Q and Z. Inputs $T_1$, $T_3$ and $\overline{T}_1$, $\overline{T}_3$ are the differential signals that determine when the system is operating in stressed data window mode. When the system is operating in stressed data window mode, signal T1 (T3) is "high" and $\overline{T}_1$ ($\overline{T}_3$) "low". Signal WS is "high" and WS "low" only when node N is at higher voltage than node Q. Similarly, signal WR is "high" and $\overline{WR}$ "low" only when node Z is at higher voltage than node N.

Waveform W of FIG. 5 is produced by the circuit of FIG. 2C in response to waveforms WS, $\overline{WS}$, WR and $\overline{WR}$. The circuit is a latch circuit. The "set" condition is $w(\text{set}) = WS \cdot T_3$, and "reset" condition is $w(\text{reset}) = WR \cdot T_3 + \overline{T}_3$. The trickle bias suppresses the effects of transient signals on operation of the circuit.

Referring again to FIG. 5, the width of waveform W, which is directly related to the stressed data window, is less than the width of a full data window or one cycle of system clock signal CL. The width of waveform W can be continuously varied by changing the offset, $\Delta M$, between waveform N on the one hand and waveform Q and Z on the other. Offset $\Delta X$, the difference in DC voltage level between waveforms Q and Z is constant, being fixed by the value of resistors R1 and R3 through which current $I_1$ flows.

As stated earlier, the pulse width of waveform W is varied by changing the offset $\Delta M$. Offset $\Delta M$ is changed by varying the DC level at nodes Q and Z with respect to the DC level at node N. The relative DC voltage level at nodes Q and Z are set by adjusting the value of R1.

Adjusting $\Delta M$ provides continuous control of the width of the stressed data window. Referring again to FIG. 2, adjustment of $\Delta M$ is provided by stress window control signal 27 at the emitter of transistor T5. Control signal 27 is derived from a conventional current digital-to-analog converter (DAC), such as an HP model 3497A Data Acquisition Control Unit, manufactured by Hewlett-Packard Co., Palo Alto, Calif.

Figure 6:
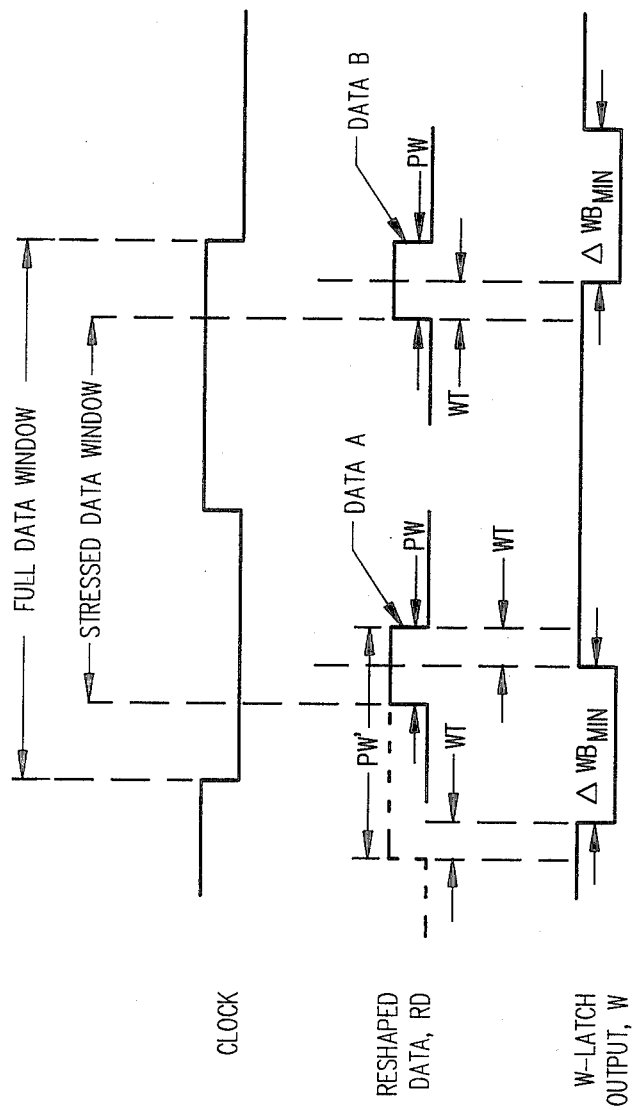
FIG. 6 is a timing diagram of the stressed data window and related waveforms generated by the system of FIG. 1.

Referring now to FIG. 6, to detect data within the stressed data window according to the present invention, reshaped input data is combined with the blocked data window signal (i.e. waveform W) to selectively accept or block a data bit. If the data bit is accepted, control signals to produce corresponding DSTC pulses will result. Conversely, if a data bit is blocked, no corresponding DSTC signal results. The blocking effect requires constant pulse width of input data pulses. As mentioned elsewhere in this specification, such constant pulse width is produced by phase discriminator 11 as part of its normal operation.

Figure 2D:
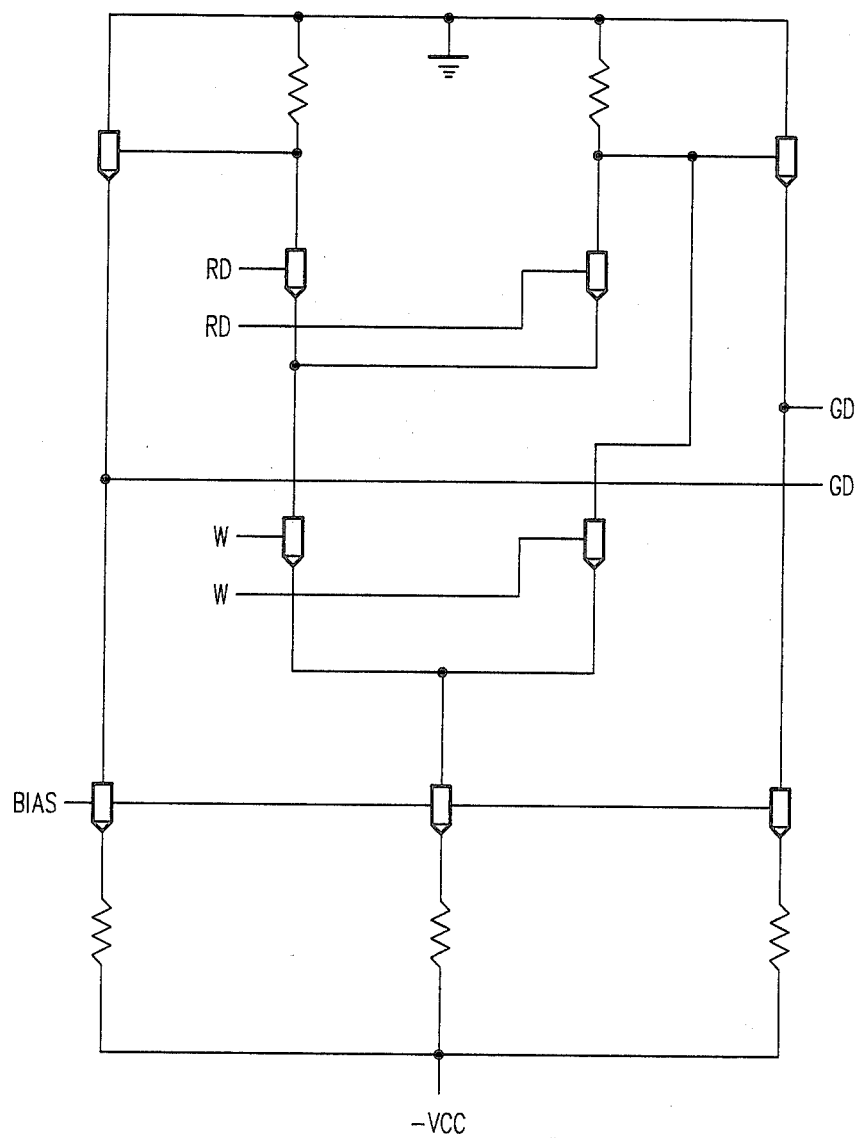
FIG. 2D is a schematic diagram of the stressed data window gate circuit for use in the system of FIG. 1.

DSTC pulses are generated in response to GD signals produced by stressed data window gate 18. Generation of DSTC pulses forms no part of the present invention. A circuit for stressed data window gate 18 is shown in FIG. 2D for producing logic control signals in response to reshaped data pulse RD and waveform W. In operation, when the reshaped data, RD, is "high" and overlaps the blocked data window signal W by at least WT (defined later), the output GD will go "high" and RD is accepted. If the overlap between the RD and W signals is less than WT, then GD will remain "low" and RD is blocked.

If width PW of data pulse A is greater than WT and overlaps waveform W at the time data pulse A arrives, then the leading edge of data pulse A will define the leading edge of the stressed data window. Similarly, the leading edge of data pulse B defines the trailing edge of the stressed data window of PW is greater then WT and overlaps waveform W as shown. The pulse width of data pulses A and B are equal for symmetry. Since the system of the present invention would interpret a wider pulse width of data pulse A, such as PW', as falling in two consecutive windows, the following relation must be imposed $$\Delta WB_{min} + 2WT \geq PW > WT, \quad (1)$$

where PW is constant reshaped pulse width of data pulses, WT is the minimum overlap of RD and W, and $\Delta WB_{min}$ is the minimum data blocking interval.

Referring again to FIGS. 2 and 5, since the charge and discharge currents in VCO 15 are constant and of equal magnitude, the voltage and time of waveforms Q, Z and N are linearly related. For symmetry, the time difference between the leading edge of the clock window boundary and the leading edge of data pulse A, namely, $\Delta A$, equals the time difference between the trailing edge of the clock window boundary and the leading edge of data pulse B, namely, $\Delta B$. Data pulses A and B are reshaped data pulses RD at two different instants of time which overlap waveform W by WT just enough to trigger the stress data window logic. Thus, for $\Delta A \equiv \Delta B$, $$K(VU+\Delta M)+D-(PW-WT)=K(VD+\Delta M)-\Delta X-D+WT \quad (2)$$

Then, $$\Delta X = K\Delta U + PW + 2WT - 2D = \text{constant} > 0, \quad (3)$$

where D is the delay of latches comprising the circuit of FIG. 2C in which equal delays have been assumed for "set" and "reset" transitions, and k is a constant representing the slope of the charging/discharging rate of capacitor C.

Since $\Delta V$ equals $VD-VU$, $\Delta X$ must equal a constant greater than zero to maintain symmetry. The stress data window may be trimmed to be symmetrical with respect to the full data window by adjusting the value of R1 to control current $I_1$. Stress data window symmetry will remina independent of current $I_2$.

With continuing reference to FIGS. 2 and 5, $\Delta M$ is given by $$\Delta M = -(I_1+I_2)R_2-(-I_3 R_4) = I_3R_4-I_1R_2-I_2R_2 \quad (4)$$

The percent reduction of the full data window achieved for the stressed data window produced by the present invention may be computed as follows:

$$\% \text{ reduction} = \frac{\Delta A}{VT} \cdot 100\% \quad (5)$$

or $$= \frac{\Delta B}{VT} \cdot 100\%$$

$$= \frac{K(VU+\Delta M)+D-(PW-WT)}{K \cdot VT} \cdot 100\% \quad (6)$$

$$= \frac{KVU+D-PW+WT+K(I_3R_4-I_1R_2)}{K \cdot VT} - \quad (7)$$

$$\frac{R_2I_2}{VT} \cdot 100\%$$

$$\propto I_2 \quad (8)$$

Percent data window reduction is therefore linearly proportional to the control current $I_2$.

Symmetry is achieved by actively trimming resistor R1 of FIG. 2. Referring now to FIG. 5, this trimming will alter the DC offset $\Delta x$, between waveforms Q and Z. For a constant current level of $I_2$, it is precisely the ability to alter the value of $\Delta x$ that provides a degree of freedom by external control for symmetry.

The stressed data window of the present invention is formed within the full data window by symmetrically blocking RD at either end thereof. RD is blocked when the $\Delta WB_{min}$ portion of W overlaps RD and is combined by stress data window gate 18. Unblocked data, GD, therefore, represents the stressed data falling within the stressed data window. Such stressed data, in turn, provides the basis for correlating data detection error rate with data window width and data bit distribution within the data window.

What is claimed is:

1. Apparatus for measuring data detection error in devices for detecting data signals, said apparatus comprising:
   first means for producing unambiguously defined timing signals in response to data signals;
   second means coupled to the first means for producing test signals including data window pulses having constant width in response to the timing and data signals;
   third means, coupled to the first means, for producing control signals for controlling the width of a test window with respect to the data window pulses; and
   fourth means, coupled to the second and third means, for producing a test window, symmetrically disposed within a data window pulse, by selectively accepting or rejecting test signal pulses in response to the control signals.

2. Apparatus as in claim 1 wherein said fourth means selectively reject test signal pulses at both ends of the test window.

3. Apparatus as in claim 2 wherein said fourth means rejects the same number of test signal pulses at both ends of the test window.

4. Apparatus as in claim 1 wherein the accepted test signal pulses are proportional to the data detection error as a function of the width of the test window.

5. Apparatus as in claim 1 wherein:

the first and second means are a phase discriminator and voltage controlled oscillator (VCO), respectively, coupled in a phase lock loop; and the third means includes circuit means for producing signals representing opposite and concurrent phases of the VCO output signals.

6. Apparatus as in claim 5 wherein the third means further includes logic means for producing width control signals in response to said phases of the VCO output signals.

7. A method for measuring data detection error in devices for detecting data signals, comprising the steps of:

producing unambiguously defined timing signals in response to data signals;

producing test signals including data window pulses having constant width in response to the timing and data signals;

producing control signals for controlling the width of a test window with respect to the data window pulses; and producing a test window, symmetrically disposed within a data window pulse, by selectively accepting or rejecting test signal pulses in response to the control signals.

8. The method as in claim 7 wherein the step of producing a test window includes the step of selectively rejecting test signal pulses at both ends of the test window.

9. The method as in claim 8 wherein the step of producing a test window includes the step of rejecting the same number of test signal pulses at both ends of the test window.

10. The method as in claim 7 wherein the accepted test signal pulses is proportional to the data detection error as a function of the width of the test window.

* * * * *